United States Patent [19]

Adams et al.

[11] Patent Number: 5,698,016

[45] Date of Patent: Dec. 16, 1997

[54] COMPOSITIONS OF MODIFIED CARBON PRODUCTS AND AMPHIPHILIC IONS AND METHODS OF USING THE SAME

[75] Inventors: Curtis E. Adams, Watertown; James A. Belmont, Acton; Robert M. Amici, Berlin, all of Mass.

[73] Assignee: Cabot Corporation, Boston, Mass.

[21] Appl. No.: 663,694

[22] Filed: Jun. 14, 1996

[51] Int. Cl.$^6$ .................................................. C09D 11/02
[52] U.S. Cl. .......................................... 106/316; 106/476
[58] Field of Search ............................... 106/20 R, 476, 106/31.6, 31.75

[56] References Cited

U.S. PATENT DOCUMENTS

| T860,001 | 3/1969 | Gessler . | |
|---|---|---|---|
| 2,121,535 | 6/1938 | Amon | 106/473 |
| 2,156,591 | 5/1939 | Jacobson | 106/475 |
| 2,502,254 | 3/1950 | Glassman | 106/476 |
| 2,514,236 | 7/1950 | Glassman | 106/499 |

(List continued on next page.)

FOREIGN PATENT DOCUMENTS

| 0 006 190 A1 | 1/1980 | European Pat. Off. . |
| 272127 | 6/1988 | European Pat. Off. . |
| 433229 | 6/1991 | European Pat. Off. . |
| 0 441 987 A2 | 8/1991 | European Pat. Off. . |
| 410152 | 2/1994 | European Pat. Off. . |
| 636591 | 2/1995 | European Pat. Off. . |
| 1164786 | 4/1960 | France . |
| 1215895 | 4/1960 | France . |
| 72775 | 4/1960 | France . |
| 1224131 | 6/1960 | France . |
| 1331889 | 5/1963 | France . |
| 2477593 | 11/1981 | France . |
| 2564489 | 11/1985 | France . |
| 2607528 | 6/1988 | France . |
| 24 26 266 | 12/1975 | Germany . |
| 3170748 | 7/1985 | Germany . |
| 59-82467 | 5/1984 | Japan . |
| 01-275666 | 11/1989 | Japan . |
| 05-271365 | 10/1993 | Japan . |
| 05-339516 | 12/1993 | Japan . |
| 06-025572 | 2/1994 | Japan . |
| 06-067421 | 3/1994 | Japan . |
| 06-073235 | 3/1994 | Japan . |
| 862018 | 3/1961 | United Kingdom . |
| 1191872 | 5/1970 | United Kingdom . |
| WO 91/15425 | 10/1991 | WIPO . |
| WO 92/13983 | 8/1992 | WIPO . |
| WO 96/18688 | 6/1996 | WIPO . |
| WO 96/18696 | 6/1996 | WIPO . |
| WO 96/37547 | 11/1996 | WIPO . |

OTHER PUBLICATIONS

Derwent Abstract, AN No. 80-03330C, "Sulphonated Carbon Pigment Production by Treating Technical Grade Carbon with Hot Aqueous Acid," SU,A,659,523, Apr. 1979.
Derwent Abstract, AN No. 82-28019E, "Penetrating Flexographic Print Ink Based Polyacrylic Resin," Oct. 17, 1979, SU,A, 834062.
Derwent Abstract, AN No. 86-335147, "Wear Resistant Rubber Composition for Tire Tread Rubber," Apr. 30, 1985, JPA 61-250042, Nov. 1986.
Derwent Abstract, AN No. 95-183086, "Tire Treated Rubber Composition," Oct. 21, 1993, JPA 07102116.
Derwent Abstract, AN No. 94-189154, "Ink for Writing Implements," May 10, 1994, JPA 61-28517A.
Patent Abstracts of Japan Publication No. JP7102116, "Rubber Composition for Tire Tread," Apr. 18, 1995.
Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.
Roberts et al., *Basic Principles of Organic Chemistry*, Second Edition, W.A. Benjamin, Inc., Pub., p. 1080, no date available.
Allen, "Thermal Ink Jet Printing Trends and Advances," BIS Ink Jet Printing Conference, Oct. 10–12, 1994, Monterey, California.
Schneider, "Continuous Ink Jet," BIS Ink Jet Printing Conference, Oct. 10–12, 1994, Monterey, California.
Major, "Formulating the Future of Automotive Coatings," *Modern Paint and Coatings*, Jul. 1993.
Greenfield, "Fewer Formulation Options Lead to Emphasis on Familiar," *Modern Paint and Coatings*, Jul. 1992.
Schrantz, "Regulations and Competition Push Technological Change," *Modern Paint and Coatings*, Jul. 1994.
"Regulations Focus Formulator Attention on Additives," *Modern Paint and Coatings*, Jul. 1994.
*The Printing Ink Manual*, Fifth Edition, R.H. Leach et al., Blueprint Press, Chapters 8, 9, and 10, 1988, no month.
Tsubokawa, "Functionalization of Carbon Black by Surface Grafting of Polymers," *Polym. Sci.*, vol. 17, pp. 417–470, 1992, no month available.
Wolff et al., "The Influence of Modified Carbon Blacks on Viscoelastic Compound Properties," *Kautschuk & Gummi, Kuststoffe* 44, Jahrgang, Nr. Oct. 1991.
Bourdillon et al., "Immobilization of Glucose Oxidase on a Carbon Surface Derivatized by Electrochemical Reduction of Diazonium Salts," *J. Electroanal. Chem.*, vol. 336, pp. 113–123, 1992, no month.
Ohkita et al., "The Reaction of Carbon Black Surface with 2,2-Diphenyl-1-Picrylhydrazyl," *Carbon*, vol. 10, No. 5, pp. 631–636, Mar. 1972.

(List continued on next page.)

*Primary Examiner*—Helene Klemanski
*Attorney, Agent, or Firm*—Martha Ann Finnegan; James A. Cairns; Michelle B. Lando

[57] ABSTRACT

A composition is disclosed which comprises a) an amphiphilic ion, and b) a modified carbon product comprising carbon having attached at least one organic group. The organic group has a charge opposite to the amphiphilic ion. Also disclosed are aqueous and non-aqueous ink and coating compositions incorporating this composition. Ink jet ink compositions are further described incorporating this composition.

41 Claims, No Drawings

5,698,016
Page 2

U.S. PATENT DOCUMENTS

| | | | |
|---|---|---|---|
| 2,625,492 | 1/1953 | Young | 106/20 R |
| 2,793,100 | 5/1957 | Weihe | 106/472 |
| 2,833,736 | 5/1958 | Glaser | 106/20 R |
| 2,867,540 | 1/1959 | Harris | 106/472 |
| 3,011,902 | 12/1961 | Jordon | 106/477 |
| 3,025,259 | 3/1962 | Watson et al. | 260/47.5 |
| 3,043,708 | 7/1962 | Watson et al. | 106/476 |
| 3,335,020 | 8/1967 | Aboytes et al. | 106/476 |
| 3,479,300 | 11/1969 | Rivin et al. | 252/430 |
| 3,528,840 | 9/1970 | Aboytes | 106/473 |
| 3,607,813 | 9/1971 | Purcell et al. | 106/20 R |
| 3,674,670 | 7/1972 | Erikson et al. | 428/411.1 |
| 3,686,111 | 8/1972 | Makhlouf et al. | 524/530 |
| 3,846,141 | 11/1974 | Ostergren et al. | 106/22 R |
| 3,876,603 | 4/1975 | Makhlouf | 106/472 |
| 4,003,751 | 1/1977 | Carder | 106/20 R |
| 4,006,031 | 2/1977 | Ferch et al. | 106/473 |
| 4,014,833 | 3/1977 | Story | 106/20 R |
| 4,014,844 | 3/1977 | Vidal et al. | 106/472 |
| 4,061,830 | 12/1977 | Greenberg | 428/469 |
| 4,176,361 | 11/1979 | Kawada et al. | 106/22 R |
| 4,204,871 | 5/1980 | Johnson et al. | 106/20 R |
| 4,204,876 | 5/1980 | Bowden | 106/474 |
| 4,290,072 | 9/1981 | Mansuhhani | 106/20 R |
| 4,293,394 | 10/1981 | Darlington et al. | 205/524 |
| 4,308,061 | 12/1981 | Iwahashi et al. | 106/22 H |
| 4,328,041 | 5/1982 | Wilson | 106/472 |
| 4,442,256 | 4/1984 | Miller | 524/539 |
| 4,451,597 | 5/1984 | Victorius | 524/39 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,525,521 | 6/1985 | DenHartog et al. | 524/517 |
| 4,525,570 | 6/1985 | Blum et al. | 528/75 |
| 4,530,961 | 7/1985 | Nguyen et al. | 106/20 R |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 R |
| 4,597,794 | 7/1986 | Ohta et al. | 106/20 R |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/110 |
| 4,719,132 | 1/1988 | Porter, Jr. | 427/409 |
| 4,727,100 | 2/1988 | Vasta | 524/40 |
| 4,741,780 | 5/1988 | Atkinson | 106/300 |
| 4,752,532 | 6/1988 | Starka | 428/482 |
| 4,764,430 | 8/1988 | Blackburn et al. | 428/413 |
| 4,770,706 | 9/1988 | Pietsch | 106/24 R |
| 4,789,400 | 12/1988 | Solodar et al. | 106/22 H |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,840,674 | 6/1989 | Schwarz | 106/22 R |
| 4,853,037 | 8/1989 | Johnson et al. | 106/22 R |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,975,474 | 12/1990 | Barsotti et al. | 523/400 |
| 4,994,520 | 2/1991 | Mori et al. | 106/20 R |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson et al. | 524/555 |
| 5,064,719 | 11/1991 | DenHartog et al. | 428/411.1 |
| 5,066,733 | 11/1991 | Martz et al. | 524/455 |
| 5,076,843 | 12/1991 | Acitelli et al. | 106/22 R |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 H |
| 5,106,417 | 4/1992 | Hauser et al. | 106/20 R |
| 5,109,055 | 4/1992 | Nagasaki et al. | 524/571 |
| 5,114,477 | 5/1992 | Mort et al. | 106/20 R |
| 5,122,552 | 6/1992 | Johnson | 523/454 |
| 5,130,004 | 7/1992 | Johnson et al. | 204/181.7 |
| 5,130,363 | 7/1992 | Scholl et al. | 524/392 |
| 5,141,556 | 8/1992 | Matrick | 106/20 R |
| 5,152,801 | 10/1992 | Altermatt et al. | 106/473 |
| 5,159,009 | 10/1992 | Wolff et al. | 524/495 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 106/20 R |
| 5,190,582 | 3/1993 | Shinozuka et al. | 106/20 D |
| 5,200,164 | 4/1993 | Medalia et al. | 106/478 |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425.8 |
| 5,229,452 | 7/1993 | Green et al. | 524/215 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,266,361 | 11/1993 | Schwarte et al. | 427/407.1 |
| 5,266,406 | 11/1993 | DenHartog et al. | 428/423.1 |
| 5,276,097 | 1/1994 | Hoffmann et al. | 525/167 |
| 5,281,261 | 1/1994 | Lin | 106/20 R |
| 5,286,286 | 2/1994 | Winnik et al. | 106/21 A |
| 5,288,788 | 2/1994 | Shieh et al. | 524/495 |
| 5,290,848 | 3/1994 | Palmer et al. | 524/517 |
| 5,302,197 | 4/1994 | Wickramanayke et al. | 106/22 A |
| 5,310,778 | 5/1994 | Shor et al. | 106/20 D |
| 5,314,945 | 5/1994 | Nickle et al. | 524/507 |
| 5,314,953 | 5/1994 | Corcoran et al. | 524/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,716 | 8/1994 | Kappes et al. | 525/23 |
| 5,336,753 | 8/1994 | Jung et al. | 528/335 |
| 5,352,289 | 10/1994 | Weaver et al. | 106/476 |
| 5,356,973 | 10/1994 | Taljan et al. | 524/314 |
| 5,366,828 | 11/1994 | Struthers | 429/101 |
| 5,401,313 | 3/1995 | Supplee et al. | 106/476 |
| 5,554,739 | 9/1996 | Belmont | 106/476 |
| 5,559,169 | 9/1996 | Belmont et al. | 106/476 |
| 5,571,311 | 11/1996 | Belmont et al. | 106/20 R |
| 5,575,845 | 11/1996 | Belmont et al. | 106/476 |

OTHER PUBLICATIONS

Watson, "Chemical Aspects of Reinforcement," Compounding Research Department, Dunlop Research Center, Dunlop Rubber Co., pp. 987–999, no date available.

Garten et al., "Nature of Chemisorptive Mechanisms in Rubber Reinforcement," Commonwealth Scientific and Industrial Research Organ., Div. of Industrial Chem., Melbourne, Australia, pp. 596–609, no date available.

Donnet et al., "Chimie Superficielle et Sites Privilegies Des Charges Fines," Extrait de la Revue Generale du Caoutchoic, Jul. 1959.

*Ullmann's Encyclopedia of Industrial Chemistry*, Fifth Edition, vol. A-8, pp. 508–509, 1987, no month.

Donnet et al., "Sur la Structure Aroxylique des Groupements Quinoniques et des Radicaux Libres Presentes en Surface des Noirs de Carbon," *Ref. Gen. Caoutchouc Plastiques*, vol. 42, No. 3, pp. 389–392, 1965 (with English Abstract), no month available.

Yamaguchi et al., "Novel Carbon Black/Rubber Coupling Agent," *Kautschuk & Gummi*, Kuntstoffe 42, Jahrgang, Nr. May 1989.

Studebaker et al., "Oxygen–Containing Groups on the Surface of Carbon Black," *Industrial and Engineering Chemistry*, vol. 48, No. 1, pp. 162–166, Jan. 1956.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

Scherrer, "Coloration of Ink Jet Inks," Presentation at BIS Ink Jet Printing Conference, Oct. 10–12, 1994, Monterey.

*Ink Jet Printing: 1994 Overview and Outlook*, Chapter 7, no date available.

*The Printing Ink Manual*, Fourth Edition, Chapter 2, Leach et al., Eds., 1988, no month available.

Andreottoia, *Ink Jet Ink Technology*, pp. 531–544, no date available.

Gregory, "*High–Technology Applications of Organic Colorants*, Chapter 9, " Ink–Jet Printing, 1991, no month.

PCT Search Report, PCT/US 95 16452, Apr. 17, 1996.
PCT Search Report, PCT/US 95/16195, Apr. 19, 1996.
PCT Search Report, PCT/US 95/16281, Apr. 26, 1996.
PCT Search Report, PCT/IB 95/01154, Apr. 29, 1996.

Rapra Abstract No. 432845, "Compounding Heat Resistant Non–Black EPDM Rubber Compounding Report," Dec. 1990.

Rapra Abstract No. 417612, "Review: Polymer–Filler Interactions in Rubber Reinforcement," Oct. 1990.

Rapra Abstract No. 403202, "Organotitanate, Zirconate Effect on Elastomers," Jun. 1990.

Rapra Abstract No. 394030, "Mechanical Properties of Natural Rubber/Grafted Cellulose Fibre Composites," 1990, no month available.

Rapra Abstract No. 390600, "Application of Coupling Agents to Elastomers," 1989, no month.

Rapra Abstract No. 00388935, "Light Coulored Fillers in Polymers," Nov. 1989.

Dialog Abstract EMA Number 8602–C1–D–0297, "Carbon Black is Better With Silica," Oct. 1985.

Rapra Abstract No. 00343229, "White and Black Fillers for Rubber Compounds," Dec. 1986.

Rapra Abstract No. 00177481, "Ethylene–Propylene Rubbers," 1981, no month available.

Rapra Abstract No. 00105623, "Putting Performance Into Thermosets with Titanium Coupling Agents," Oct. 1976.

Rapra Abstract No. 00056893, "Applications for Silane Coupling Agents in the Automotive Industry," Oct. 1975.

Rapra Abstract No. 00002608, "Ground Rice Hull Ash as a Filler for Rubber," Oct. 1974.

Rapra Abstract No. 00000937, "Reduction of Heat Build–up in Mineral–Filled Elastomers Through the Use of Silane Coupling Agents," May 1973.

Tsubokawa et al., "Grafting Onto Carbon Black Having Few Functional Groups," Shikizai Kyokaisha, vol. 66, No. 5 (1993), Abstract Only, no month available.

J.B. Donnet et al., "Radical Reactions and Surface Chemistry of Carbon Black," Bull. Soc. Chim. 1960 (Abstract Only), no month available.

Delamar et al., J. Am. Chem. Soc. 1992, 114, 5883–5884, no month available.

COMPOSITIONS OF MODIFIED CARBON PRODUCTS AND AMPHIPHILIC IONS AND METHODS OF USING THE SAME

BACKGROUND OF THE INVENTION

1. Field of the Invention

This invention relates to modified carbon products, compositions prepared from modified carbon products and methods using the same.

2. Discussion of the Related Art

The concept of using the acid or base properties of a surface to improve wetting or dispersion stability is not new. The use of ionic surfactants to improve wetting or dispersion stability of ionic or polar materials in a non-polar environment/solvent has been used in many instances. A major limitation of this approach is that many solids do not have a sufficient number of polar groups available on the surface to allow the use of relatively simple compounds to impart stabilization or improve wetting. In these cases polymeric materials may be used to impart the stabilization. In the case of carbon blacks with high surface areas, as used in high color coatings applications, some formulations require nearly equal weights of polymeric material to sufficiently treat the surface.

If the acid/base interaction between a surface and an adsorbant is weak, this interaction is easily overcome by a polar solvent. If the interaction strength can be increased, so will the stability of a surface/adsorbent complex.

Carbon black typically has only very low levels of ionic functionality on its surface. If the level of ionic groups on the surface is increased, the number of potential binding sites on the surface should also increase. In this way the efficiency of a suitably charged adsorbent interaction with a carbon surface may be enhanced.

SUMMARY OF THE INVENTION

The present invention relates to a composition comprising an amphiphilic ion and a modified carbon product comprising carbon having attached at least one organic group. The modified carbon product has a charge opposite to the amphiphilic ion. The present invention further relates to a suspension comprising the above composition and a carrier or a liquid vehicle.

The present invention also relates to coatings and ink compositions comprising the above-described composition. The carbon may be of the crystalline or amorphous type. Examples include, but are not limited to, graphite, carbon black, vitreous carbon, carbon fibers, and activated charcoal or activated carbon. Finely divided forms of the above are preferred; also, it is possible to utilize mixtures of different carbons.

DESCRIPTION OF THE PREFERRED EMBODIMENTS

The compositions of the present invention comprise an amphiphilic ion and a modified carbon product. The modified carbon product comprises carbon having attached at least one organic group. The modified carbon product has a charge opposite to the amphiphilic ion.

In further detail, the amphiphilic ion is a molecule having a hydrophilic polar "head" and a hydrophobic organic "tail." The amphiphilic ion of the present invention can be a cationic or anionic amphiphilic ion.

Examples of cationic amphiphilic ions include, but are not limited to, ammonium ions that may be formed from adding acids to the following: a fatty amine, an ester of an aminoalcohol, an alkylamine, a polymer containing an amine functionality, an aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine.

More specific and preferred examples of cationic amphiphilic ions include, but are not limited to, ammonium ions that may be formed from adding acids to the following: an ester of an aminodiol, an ester of an aminotriol, a polyethyleneimine, a polyvinylpyridine, a polyvinylimidazole, mixed polymers containing at least one amino-functional monomer (including vinyl imidazole or vinyl pyridine), a fatty alcohol ester of aspartic acid, a fatty alcohol ester of glutamic acid, a pyridine derivative, an imidazole, or an imidazoline. Esters as used herein include diesters or triesters. The pKa of the ammonium ion is preferably greater than the pKa of the protonated form of the ionic group on the carbon.

As stated earlier, the amphiphilic ion can alternatively be an anionic amphiphilic ion. Examples of such anionic amphiphilic ions include, but are not limited to, an alkylbenzene sulfonate, an alkyl sulfonate, an alkylsulfate, a sarcosine, a sulfosuccinate, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, an aliphatic carboxylate, or an ion derived from a polymer containing an acid group.

Sources of specific and preferred examples of anionic amphiphilic ions include, but are not limited to, sodium dodecylbenzene sulfonate, a sodium dodecylsulfate, Aerosol OT, an oleic acid salt, a ricinoleic acid salt, a myristic acid salt, a caproic acid salt, sodium bis(2-ethylhexyl) sulfosuccinate, a sulfonated polystyrene, or homo- or copolymers of acrylic acid or methacrylic acid or salts thereof.

Table 1 provides a listing of preferred compounds useful as sources of amphiphilic ions which may be used in the compositions of the present invention.

TABLE 1

| COMPOUND LISTING | |
|---|---|
| CATIONIC AMPHIPHILES | |
| Simple Amines | Guanidines |
| Stearylamine | Stearyl guanidine |
| Dodecylamine | Oleyl guanidine |
| Dimethyldodecylamine | Ditolylguanidine |
| Dioctylamine | Aerosol C-61 |
| Fatty Amines and Derivatives | |
| Soyaalkylamine | Cocaalkylamine |
| Oleylamine | Dimethylcocaalkylamine |
| Ricinolamine | Ethomeen ® S/12 |
| Dimethyloleylamine | Norfox IM-38 |
| N-Oleyldiaminopropane | |
| N-Tallow dipropylenetriamine | |

TABLE 1-continued

COMPOUND LISTING

Maleated Triamines (Polyamines)

N-(dioleylsuccinyl) dipropylenetriamine
N,N',N''-tris-(dioleylsuccinyl) dipropylenetriamine
N,N'-bis'(dioleylsuccinyl)-N''-(di-(methyl tripropylene glycol)succinyl) dipropylenetriamine

| Amino Acid Derived | Anilines |
| --- | --- |
| Dimyristyl glutamate | Aniline |
| Dioleyl glutamate | 4-Dodecylaniline |
| Di-(PEG350 monomethyl ether) glutamate | |
| Di-(PEG750 monomethyl ether) glutamate | |
| Dimyristyl aspartate | |
| Di-(bis(2'-methoxyethyl)capramid-6-yl) glutamate | |
| Di-(2'-ethylhexylcapramid-6-yl) glutamate | |
| Di-(2'-methoxyethylcapramid-6-yl) glutamate | |

Pyridine Derived

| 4-(1'-Butyl)pentyl pyridine | 4-t-Butyl Pyridine |
| --- | --- |
| Butyl Nicotinate | |

Quaternary Derivatives

Trimethylsoyaalkylammonium Chloride
Trimethylcetylammonium Chloride
Trimethyldodecylammonium Chloride
1-Dodecylpyridinium Chloride
Tetraphenylphosphonium Chloride
Incrosoft CFI-75
Incrosoft O-90
Ethoquad O/12

Aminoalcohol Esters

Diethanolamine Dioleate
Diethanolamine Dimyrisate
N-Methyldiethanolamine Dioleate
N-Methyldiethanolamine Dimyristate
2-Amino-2-methyl-1,3-propanediol dioleate
2-Amino-2-methyl-1,3-propanediol dimyristate
Tris-(hydroxymethyl)-aminomethane trioleate
Tris-(hydroxymethyl)-aminomethane trimyristate

Polymeric

| Copolymers of | Polyethyleneimine |
| --- | --- |
| Dimethylaminoethyl methacrylate and methyl methacrylate | Polyvinylpyridine |
| Poly(propyleneglycol)bis(2-aminopropylether) | Polyvinylimidazole |

ANIONIC AMPHIPHILES

| Dodecylbenzene sulfonic acid, Na salt | Marlowet 4540 |
| --- | --- |
| Dodecylsulfate, Na Salt | Sodium laureth sulfate |
| | Myristic Acid Na salt |
| Ricinoleic Acid, Na Salt | Sodium Oleate |
| | Oleyl sarcosine |
| Aerosol OT | Avanel S-150 |
| | Adinol OT16 |

**Ethomeen and Ethoquad are from Akzo Chemicals, Inc., Chicago, IL; Norfox is from Norman Fax & Co., Vernon, CA; Aerosol is from Cytec Industries, Inc., West Patterson, NJ; Incrosoft is from Croda, Inc., Parsippany, NJ; Texapon N25 is from Henkel KGaA/Cospha, Dusseldorf, Germany; Avanel is from PPG Industries/Specialty Chemicals, Gurnee, IL; and Adinol is from Croda Chemical, Ltd., North Humberside, UK; Marlowet is from Hüls AG, Marl, Germany.

Generally, to form the ammonium ions described above, the various compounds described above such as fatty mines, esters of amino alcohols, etc., are reacted with an acid such as carboxylic acid, a mineral acid, an alkyl sulfonic acid, or an aryl sulfonic acid.

Quaternary ammonium salts can also be used as the sources of the cationic amphiphilic ion. Examples include, but are not limited to, a fatty alkyl trimethyl ammonium, an alkyl trimethyl ammonium, or 1-alkyl pyridinium salts, where the counter ion is a halide, sulfonate, a sulfate or the like. Also, phosphonium salts, such as tetraphenylphosphonium chloride can be used as the sources of the amphiphilic ion.

Another example of a suitable amphiphilic ion is a polymer containing an ammonium ion derived from an amine containing polymer. The amine containing polymer can be a copolymer of an amine containing monomer, such as dimethylaminoethyl methacrylate or -acrylate, or vinylpyridine or vinylimidazole, and another monomer such as methyl acrylate, methyl methacrylate, butyl acrylate, styrene, and the like. The polymer may also be a ter- or tetra-polymer containing a mixture of an amine containing monomer and two or three other monomers, respectively. Such a polymer may be prepared by any means, such as radical (emulsion, suspension, or solution) or anionic polymerization.

With regard to amount of the amphiphilic ion that is present in the composition of the present invention, generally, the amount of amphiphilic ion added should be sufficient to neutralize at least a portion of the charged groups on the carbon surface. It is preferred to neutralize about 75% or more of the charged groups on the carbon surface. Flocculation may or may not occur during neutralization.

Generally, the above-identified amphiphilic compounds are commercially available or can be routinely made by one of ordinary skill in the art.

Regarding the second component of the compositions of the present invention, the carbon may be of the crystalline or amorphous type. Examples include, but are not limited to, graphite, carbon black, carbon fibers, vitreous carbon, activated charcoal, activated carbon, and mixtures thereof. Finely divided forms of the above are preferred; also, it is possible to utilize mixtures of different carbons. The modified carbon products may be preferably prepared by reacting carbon with a diazonium salt in a liquid reaction medium to attach at least one organic group to the surface of the carbon. The diazonium salt may contain the organic group to be attached to the carbon. A diazonium salt is an organic compound having one or more diazonium groups. Preferred reaction media include water, any medium containing water, and any medium containing alcohol. Water is the most preferred medium. Examples of modified carbon products, wherein the carbon is carbon black, and various preferable methods for their preparation are described in U.S. patent application Ser. No. 08/356,660 entitled "Reaction of Carbon Black with Diazonium Salts, Resultant Carbon Black Products and Their Uses," filed Dec. 15, 1994, now abandoned and its continuation-in-part application, U.S. patent application Ser. No. 08/572,525, filed Dec. 14, 1995, both of which are incorporated herein by reference. Examples of modified carbon products, wherein the carbon is not carbon black, and various preferable methods for their preparation are described in patent application Ser. No. 08/356,653 entitled "Reaction of Carbon Materials With Diazonium Salts and Resultant Carbon Products," filed Dec. 15, 1994, now U.S. Pat. No. 5,554,739 also incorporated herein by reference.

In the preferred preparation of the above modified carbon products, the diazonium salt need only be sufficiently stable to allow reaction with the carbon. Thus, that reaction can be carried out with some diazonium salts otherwise considered to be unstable and subject to decomposition. Some decomposition processes may compete with the reaction between the carbon and the diazonium salt and may reduce the total number of organic groups attached to the carbon. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts may be prepared in situ. It is preferred that the modified carbon products contain no by-products or unattached salts.

In the preferred process of preparation, carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology. Other carbons can be similarly reacted with the diazonium salt. In addition, when modified carbon products utilizing carbon other than carbon black are used in ink jet inks, the carbon should preferably be ground to a fine particle size before reaction with the diazonium salt in the preferred process to prevent unwanted precipitation in the inks and coatings.

Regarding the organic group attached to the carbon, the organic group preferably comprises at least one aromatic group or at least one $C_1$–$C_{12}$ alkyl group and further contains at least one ionic group, at least one ionizable group, or a mixture of an ionic group and an ionizable group. Preferably, the aromatic group or the $C_1$–$C_{12}$ alkyl group is directly attached to the carbon.

A preferred set of organic groups which may be attached to the carbon are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the alkyl group of the organic group is directly attached to the carbon. The aromatic group may be further substituted or unsubstituted, for example, with alkyl groups. The $C_1$–$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include —COOH, —SO$_3$H and —PO$_3$H$_2$, —SO$_2$NH$_2$, —SO$_2$NHCOR, and their salts, for example —COONa, —COOK, —COO$^-$NR$_4^+$, —SO$_3$Na, —HPO$_3$Na, —SO$_3^-$NR$_4^+$, and PO$_3$Na$_2$, where R is an alkyl or phenyl group. Particularly preferred ionizable substituents are —COOH and —SO$_3$H and their sodium and potassium salts.

Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion are p-sulfophenyl, 4-hydroxy-3-sulfophenyl, and 2-sulfoethyl.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—NR$_3^+$) and quaternary phosphonium groups (—PR$_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. The aromatic group is preferably directly attached to the carbon. Quaternized cyclic amines, and quaternized aromatic amines, can also be used as the organic group. Thus, N-substituted pyridinium compounds, such as N-methyl-pyridyl, can be used in this regard. Examples of organic groups include, but are not limited to, 3—C$_5$H$_4$N(C$_2$H$_5$)$^+$, C$_6$H$_4$NC$_5$H$_5^+$, C$_6$H$_4$COCH$_2$N(CH$_3$)$_3^+$, C$_6$H$_4$COCH$_2$(NC$_5$H$_5$)$^+$, 3—C$_5$H$_4$N(CH$_3$)$^+$, and C$_6$H$_4$CH$_2$N(CH$_3$)$_3^+$.

An advantage of the modified carbon products having an attached organic group substituted with an ionic or an ionizable group is that the modified carbon products may have increased water dispersibility relative to the corresponding untreated carbon. In general, water dispersibility of the modified carbon products increases with the number of organic groups attached to the carbon having an ionizable group or the number of ionizable groups attached to a given organic group. Thus, increasing the number of ionizable groups associated with the modified carbon products should increase their water dispersibility and permits control of the water dispersibility to a desired level. It can be noted that the water dispersibility of modified carbon products containing an amine as the organic group attached to the carbon may be increased by acidifying the aqueous vehicle.

When water dispersible modified carbon products are prepared, it is preferred that the ionic or ionizable groups be ionized in the reaction medium. The resulting product dispersion or slurry may be used as is or diluted prior to use. Alternatively, the modified carbon products may be dried by techniques used for conventional carbon blacks. These techniques include, but are not limited to, drying in ovens and rotary kilns. Overdrying, however, may cause a loss in the degree of water dispersibility. In the event that the modified carbon products above do not disperse in the aqueous vehicle as readily as desired, the modified carbon products may be dispersed using conventionally known techniques such as milling or grinding. For purposes of the present invention, the modified carbon product has a charge. The charge preferably is created by the organic group attached to the carbon. As explained earlier, if the modified carbon product is anionic, then the amphiphilic compound will be cationic. Similarly, if the modified carbon product is cationic, then the amphiphilic compound will be anionic.

Preferably, an aryl group or a $C_1$–$C_{12}$ alkyl group is attached directly to the carbon material to form the modified carbon product and the aryl group further contains at least one ionic or ionizable group. Examples of preferred groups forming anionic carbons include, but are not limited to, $—SO_3H$, $—COOH$, $—PO_3H_2$, $—B(OH)_2$, $—OSO_3H$, $—OPO_3H_2$, and salts thereof. Further examples of groups forming cationic carbon products include $C_6H_4NC_5H_5^+$, 3-(1-methylpyridinium), and $C_6H_4N(CH_3)_3^+$ groups attached to the carbon material.

If the composition of the present invention is sufficiently hydrophobic, the addition of the amphiphilic ion to an aqueous dispersion of the carbon having ionic groups results in flocculation of the carbon. This material can then easily be isolated by such means as filtration. It has been found that some of these types of compositions may then be easily dispersed into organic solvents such as xylene, heptane, methylamyl ketone, butyl acetate, benzyl alcohol, butanol, methane chloride, acetone, and the like. In some cases, the carbon product of the present invention may be extracted into organic solvents.

A preferred way to prepare the compositions of the present invention includes taking an aqueous dispersion of the modified carbon product and combining it with the amphiphilic ion. For instance, an aqueous dispersion of an anionically functionalized carbon black can be combined with an amine containing compound and one or more equivalents of an acid; or can be combined with a quaternary ammonium salt; or can be combined with an amine containing polymer and one or more equivalents of an acid. The resulting mixture which forms the compositions of the present invention can then be isolated (e.g., filtration or evaporation).

Alternatively, an aqueous dispersion of the modified carbon product, as its free acid, may be combined with an amine containing amphiphile. In this way the modified carbon product protonates the amine, thus forming ions from each of the two components. The complimentary case may be useful for a modified carbon product bearing a free base with an acidic amphiphilic compound.

A modified carbon product having attached anionic groups may be added to a continuously operating pin mixer along with a cationic amphiphilic ion in an aqueous solution. This allows for mixing of the materials. This process forms the composition of the present invention. The resultant material may be dried or used directly.

The compositions of the present invention can form a suspension with a suitable carrier or liquid vehicle. Such carriers and liquid vehicles are known to those skilled in the art.

The compositions and suspensions of the present invention can be incorporated into various formulations such as inks, coatings, and ink jet inks, whether these formulations are aqueous or nonaqueous. Generally, the amount of the composition to be used in the inks, coatings, ink jet inks, and plastics would be about the same as used when conventional carbon black is the pigment.

As stated earlier, the compositions of the present invention are useful in non-aqueous ink formulations. Thus, the invention provides an improved ink composition containing a solvent and a composition of the present invention. Other known ink additives may be incorporated into the ink formulation. It is also within the bounds of the present invention to use an ink formulation containing a mixture of unmodified carbon with the compositions of the present invention.

In general, an ink includes a colorant or pigment and solvents to adjust viscosity and drying. An ink may optionally further include a vehicle or varnish which functions as a carrier during printing and/or additives to improve printability, drying, and the like. For a general discussion on the properties, preparation and uses of inks, see *The Printing Manual*, 5th Ed., R. H. Leach, et al, Eds. (Chapman & Hall, 1993).

The compositions of the present invention can be incorporated into an ink formulation using standard techniques either as a predispersion or as a solid. Use of the compositions of the present invention may provide a significant advantage and cost savings by reducing the viscosity of the formulation. This may also allow higher loading of carbon product in a formulation. The milling time may be reduced as well. The compositions of the present invention may also provide improved jetness, blue tone, and gloss.

The compositions of the present invention may also be used in non-aqueous coating compositions such as paints or finishes. Thus, an embodiment of the present invention is a coating composition containing a suitable solvent and the composition of the present invention. Other conventional coating additives may be incorporated into the non-aqueous coating compositions such as resins.

Non-aqueous coating formulations vary widely depending on the conditions and requirements of final use. In general, coating systems contain up to 30% by weight carbon. The resin content can vary widely up to nearly 100%. Examples include acrylic, alkyd, urethane, epoxy, cellulosics, and the like. Solvent content may vary between 0 and 80%. Examples include aromatic hydrocarbons, aliphatic hydrocarbons, alcohols, polyalcohols, ketones, esters, and the like. Two other general classes of additives are fillers and modifiers. Examples of fillers are other coloring pigments, clays, talcs, silicas, and carbonates. Fillers can be added up to 60% depending on final use requirements. Examples of modifiers are flow and leveling aids and biocides generally added at less than 5%. The compositions of the present invention can be incorporated into a non-aqueous coating composition using standard techniques either as a predispersion or as a solid.

Examples of non-aqueous media for the incorporation of compositions containing the modified carbon products of the present invention include, but are not limited to, melamine-acrylic resins, melamine-alkyd resins, urethane-hardened alkyd resins, urethane-hardened acrylic resins and the like. The compositions of the present invention may also be used in aqueous emulsion paints. In these types of paints, there is a non-aqueous portion containing the pigment wherein the non-aqueous portion is then dispersed in the aqueous paint. Accordingly, the compositions of the present invention can be used as part of the non-aqueous portions which is then dispersed into the aqueous emulsion paints.

The compositions of the present invention are also useful in aqueous ink and coating formulations. Aqueous includes mixtures of water and other water-miscible or -dispersible substances such as alcohol. Thus, the invention provides an aqueous ink composition comprising water and a composition according to the invention. Other known aqueous ink additives may be incorporated into the aqueous ink formulation. As stated previously, an ink may consist of four basic components described above. Various aqueous ink compositions are also disclosed, for example, in U.S. Pat. Nos.

2,833,736; 3,607,813; 4,104,833; 4,308,061; 4,770,706; and 5,026,755, all incorporated herein by reference.

The composition of the present invention, either as a predispersion or as a solid, can be incorporated into an aqueous ink formulation using standard techniques.

Flexographic inks represent a group of aqueous ink compositions. Flexographic inks generally include a colorant, a binder, and a solvent. The composition of the invention may be useful as flexographic ink colorants. The composition of the invention can be used in aqueous news inks. For example, an aqueous news ink composition may comprise water, the compositions of the invention, a resin and conventional additives such as antifoam additives or a surfactant.

The compositions of this invention may also be used in aqueous coating compositions such as paints or finishes. Thus, an embodiment of the invention is an improved aqueous coating composition comprising water, resin and a composition according to the invention. Other known aqueous coating additives may be incorporated the aqueous coating composition. See, for example, McGraw-Hill Encyclopedia of Science & Technology, 5th Ed. (McGraw-Hill, 1982), incorporated herein by reference. See also U.S. Pat. Nos. 5,051,464, 5,319,044, 5,204,404, 5,051,464, 4,692,481, 5,356,973, 5,314,945, 5,266,406, and 5,266,361, all incorporated herein by reference.

The compositions of the invention, either as a predispersion or as a solid, can be incorporated into an aqueous coating composition using standard techniques.

An ink or coating may be used for a variety of uses. Preferably, in aqueous inks and coatings of the present invention, the compositions of the present invention are present in an amount of less than or equal to 20% by weight of the ink or coating. It is also within the bounds of the present invention to use an aqueous or non-aqueous ink or coating formulation containing a mixture of unmodified carbon with the compositions of the present invention. Common additives such as those discussed below may be added to the dispersion to further improve the properties of the aqueous ink or coating.

Also, the compositions of the present invention can be used in ink jet inks where the ink formulation may be based on solvents, water, or an aqueous emulsion.

Formation of a non-aqueous or aqueous emulsion ink jet ink containing a suitable vehicle and stably dispersed composition of the present invention as pigment can be performed with a minimum of components and processing steps when the above carbon products are utilized. Such an ink may be used in ink jet printers which are known in the art. Preferably, in ink jet inks of the present invention, the compositions of the present invention are present in an mount of less than or equal to 20% by weight of the ink jet ink. It is also within the bounds of the present invention to use an ink jet ink formulation containing a mixture of unmodified carbon with the compositions of the present invention. Additives and/or binders known to those skilled in the art may be added to the dispersion to further improve the properties of the ink jet ink.

Additionally, the ink jet inks may incorporate some dye to modify color balance and adjust optical density. Appropriate dyes would be known to those skilled in the art.

Additionally, in preparing ink jet inks utilizing the composition of the present invention, sequential filtration of the inks through filters of descending size may be used to obtain a more desirable final product. For instance, filtering first with a 3.0 micron filter and then filtering with a 1.0 micron filter, and so on, as desired. In addition, the size of the modified carbon product in the ink jet inks is preferably no larger than about 2 microns. More preferably, the size of the composition of the present invention is one micron or less.

The following examples are intended to illustrate, not limit, the claimed invention.

BET Nitrogen surface areas were obtained using ASTM D-4820. CTAB area measurements were obtained using ASTM D-3760. DBPA data were obtained using ASTM D-2414. Optical properties of the ink and coating films were determined with the following instruments: L*a*b* values with a Hunter Lab Scan 6000 at 10 degree D65 CIELAB color space instrument; optical density was measured with a MacBeth RD918 densitometer; gloss was measured with a BYK Gardner model 4527 glossmeter.

The nitrogen and external surface area (t-area) was measured following the sample preparation and measurement procedure described in ASTM D-3037. For this measurement the nitrogen adsorption isotherm is extended up to 0.55 relative pressure. The relative pressure is the pressure (P) divided by the saturation pressure (Po, the pressure at which the nitrogen condenses). The adsorption layer thickness (t in angstroms) was calculated using the relation:

$$t=0.88(P/Po)^2+6.45(P/Po)+2.98.$$

The volume (v) of nitrogen adsorbed was then plotted against h and a straight line was then fitted through the data points for t values between 3.9 and 6.2 angstroms. The t-area was then obtained from the slope of this line as follows:

$$t\text{-area}, m^2/g=15.47\times\text{slope}.$$

Sulfur contents on the carbon black product were determined by combustion analysis after Soxhlet washing of each sample. The mmol sulfur attached was determined by difference from the assay of the untreated carbon black.

EXAMPLE 1

Preparation of Dimyristyl Glutamate

This procedure was adapted from that published by P. Berndt, et al., *J. Amer. Chem. Soc.*, 1995, 117, 9515. A mixture of myristyl alcohol (21.43 g), L-glutamic Acid (7.36 g) and p-toluenesulfonic acid monohydrate (10.77 g) in toluene (75 mL) was refluxed under nitrogen. Water was separated from the distillate in a Barrett distilling receiver. When the theoretical amount of water (2.8 g) was collected, the heating was stopped and the toluene removed in vacuo on a rotary evaporator. The product solidified to an off-white mass (38.13 g).

This material was recrystallized from acetone (100 mL) to afford the dimyristyl glutamate as its p-toluenesulfonate salt (77% overall yield).

EXAMPLE 2

Preparation of 2-amino-2-methyl-1,3-propanediol dioleate

A mixture of 2-amino-2-methyl-1,3-propanediol (5.26 g), oleic acid (33.4 mL) and p-toluenesulfonic acid monohydrate (11.0 g) in toluene (75 mL) was refluxed under nitrogen. Water was separated from the distillate in a Barrett distilling receiver. When the theoretical amount of water (3.3 g) was collected, the heating was stopped and the toluene removed in vacuo on a rotary evaporator. The product was a thick yellow oil.

This material was converted to the free base by dissolving in methylene chloride (250 mL) and washing with 1N NaOH solution (3×75 mL), then with deionized water (3×75 mL) and a saturated NaCl solution (2×50 mL). The solution was dried over $Na_2SO_4$, filtered, and evaporated to afford a pale yellow oil (88%).

EXAMPLE 3

Preparation of Dioleyl maleate

A mixture of maleic anhydride (88.25 g), oleyl alcohol (483.28 g), p-toluenesulfonic acid monohydrate (8.56 g), and toluene (650 mL) was refluxed under nitrogen. Water was separated from the distillate in a Barrett distilling receiver. When the theoretical amount of water (17 g) was collected, the heating was stopped and the toluene removed in vacuo on a rotary evaporator. The product was a brown oil (532 g) and was used in Example 4 without further purification.

EXAMPLE 4

Preparation of N-(dioleyl succinyl) Dipropylenediamine

N-(3-Aminopropyl)-1,3-propane diamine (19.68 g) was dissolved in isopropanol (150 mL) in a 3-necked 1-liter round bottomed flask equipped with a water-cooled condenser, magnetic stirrer and addition funnel. A solution of dioeyl maleate (92.55 g, Example 3) in isopropanol (150 mL) was charged to the addition funnel. The diamine solution was heated to reflux and the dioleyl maleate solution was added over 7 hours. Analysis of the reaction mixture by thin layer chromatography (silica gel plate 7:3 ethanol/ethyl acetate with 1% $NH_4OH$) showed complete consumption of starting materials. The solvent was removed in vacuo on a rotary evaporator to afford the product as an orange oil (113 g).

EXAMPLE 5

Preparation of N,N-Bis(2'-methoxyethyl)-6-hydroxyhexanamide

A mixture of Bis(2-methoxyethyl)amine (11.85 g) and toluene (100 mL) was warmed to 65° C. under nitrogen. A solution of epsilon-Caprolactone (9.23 g) in toluene (35 mL) was added over several minutes. The mixture was stirred at this temperature until all the caprolactone was consumed, as determined by thin layer chromatography (silica gel plate), 4:1 ethanol/$NH_4OH$). After 20 hours, an additional portion of bis(2-methoxyethyl)amine (3.1 g) was added and heating continued. After about 36 hours, all caprolactone had been consumed. The solvent was removed in vacuo on a rotary evaporator to afford the product as an oil (21.7 g).

The product was purified by passing a solution of the crude product in 90% ethanol (135 mL) through a bed of DOWEX 50WX4-200 ion exchange resin. The resin was eluted with an additional portion of ethanol (100 mL). The combined eluates were concentrated in vacuo to afford the desired product as a yellow oil (59% overall yield).

DOWEX is a trademark of the Dow Chemical Co., Midland, Mich.

EXAMPLE 6

Preparation of Di(N,N-Bis(2'-methoxyethyl)-capramid-6-yl)Glutamate

A mixture of N,N-Bis(2'-methoxyethyl)-6-hydroxyhexanamide (10.0 g, Example 5), L-glutamic Acid (2.97 g) and p-toluenesulfonic acid monohydrate (4.03 g) in toluene (30 mL) was refluxed under nitrogen. Water was separated from the distillate in a Barrett distilling receiver. When the theoretical amount of water (1.1 g) was collected, the heating was stopped and the toluene removed in vacuo on a rotary evaporator. The product was obtained as its p-toluenesulfonate salt as a brown oil (15.51 g).

EXAMPLE 7

Preparation of a Carbon Black Product Using a Pin Pelletizer

An eight inch diameter pin pelletizer was charged with 400 g of a carbon black with a nitrogen surface area of 58 $m^2$/g and a DBPA of 46 ml/100 g and 32 g sulfanilic acid. The pelletizer was run at 150 rpm for 1 minute. Deionized water (132 mL) and sodium nitrite (12.75 g) were added and the pelletizer was run for 2 minutes at 250 rpm. The pelletizer was stopped and the shaft and pins were scraped off, then the pelletizer was run at 1100 rpm for an additional 2 minutes. The 4-sulfobenzenediazonium hydroxide inner salt was generated in situ, and it reacted with the carbon black. The product was discharged from the pelletizer and dried in an oven at 70°–100° C. The product had attached p-$C_6H_4SO_3Na$ groups. Analysis of a Soxhlet extracted sample for sulfur content indicated that this product had 0.162 mequiv/g attached sulfonate groups.

EXAMPLE 8

Preparation of a Carbon Black Product

This procedure describes the preparation of a carbon black product under continuous operating conditions. 100 parts per hour of a carbon black having a CTAB surface area of 350 $m^2$/g and a DBPA of 120 mL/100 g was charged to a continuously operating pin mixer with 25 parts per hour of sulfanilic acid and 10 parts per hour of sodium nitrite as an aqueous solution. The resultant material was dried to give a carbon black product having attached p-$C_6H_4SO_3Na$ groups. Analysis of a Soxhlet extracted sample for sulfur content indicated that the product had 0.95 mequiv/g attached sulfonate groups.

EXAMPLE 9

Preparation of N-(4-aminophenyl)pyridinium nitrite

Silver nitrite (25.4 g) was added to a solution of 34.1 g of N-(4-aminophenyl)pyridinium chloride in 150 mL of methanol and the mixture was heated at reflux for one hour and allowed to cool to room temperature. The mixture was filtered and the methanol was removed under vacuum to give N-(4-aminophenyl)pyridinium nitrite.

EXAMPLE 10

Preparation of a Carbon Black Product

Preparation of the Quat Black

In pin mixer, 35.8 g of N-(4-aminophenyl)pyridinium nitrite and 300 g of a carbon black with a CTAB surface area of 108 $m^2$/g and a DBPA of 116 mL/100 g were mixed. While mixing, 200 g of water, a solution of 14.7 g of concentrated nitric acid in 50 g of water, and 50 g of water were added sequentially. Mixing was continued for an additional 3.5 minutes. The resultant material was a mixture of a carbon black product having attached $C_6H_4N(C_5H_5)^+$ groups and water containing 53.3% solids. A sample of this material that had been dried and subjected to Soxhlet extraction with ethanol overnight contained 0.91% nitrogen, compared to 0.01% nitrogen for the untreated carbon. Therefore, the dried product had 0.32 mmol/g of attached $C_6H_4N(C_5H_5)^+NO_3^-$ groups.

A dispersion (50 g) having 5 g solids was prepared by mixing 9.38 g of the undried material with water. Sodium bis(2-ethylhexyl) sulfosuccinate (1.22 g) was added. 2-Heptanone (450 mL) and water (400 g) were added, and the mixture was shaken. Sodium chloride was added to break the emulsion, and the aqueous layer was removed in a separatory funnel. The aqueous layer was substantially free of carbon black. The carbon black product in the heptanone layer had a UPA mean particle diameter of 0.15μ. The heptanone layer was filtered through a 325 mesh screen, and the material on the screen was washed with additional heptanone until the washings were colorless. The screen was dried and the residue on it corresponded to 1.5% of the total carbon black product used.

Mean particle diameters and the maximum particle diameters were measured using a MICROTRAC Ultrafine Particle Analyzer from Leeds & Northrup Co., St. Petersburg, Fla. The following conditions were used: nontransparent, nonspherical particles; particle density=1.86 g/cm$^3$; with 2-heptanone as the dispersing liquid. (MICROTRAC is a registered trademark of Leeds & Northrup Co.).

EXAMPLE 11

Flocculation/Solvent Dispersion of Carbon Black Products

The carbon black product of Example 7 containing 0.26 mequiv $SO_3^-$/g or a carbon black product of Example 8 containing 0.95 mequiv $SO_3^-$/g was dispersed in approximately 10 mL deionized water. A solution of one molar equivalent of the compound shown in the table below in 1 mL acetic acid was added to the dispersion with stirring and/or shaking. After about 5 minutes, the dispersion was examined for evidence of flocculation. Those materials which caused the dispersion to flocculate are indicated in the table. These materials were then tested for solvent dispersibility by adding ca. 1 mL of dispersion to a mixture of an organic solvent and deionized water, and then shaking vigorously. Results are indicated in the table. Conditions not tested are marked with "-".

| Compound | Flocculate ? | Butyl Acetate | Xylene | 2-Heptanone | Benzyl Alcohol | Heptane | Magie 47 oil |
|---|---|---|---|---|---|---|---|
| Stearylamine[a] | Yes | Yes* | Yes* | — | — | — | — |
| Hexadecylamine[a] | Yes | Yes | No | No | No | No | Yes* |
| Oleylamine[a] | Yes | Yes | Yes | Yes | Yes* | Yes* | Yes* |
| Ditolylguanidine[b] | Yes | No | No | — | — | No | — |
| Example 4[a] | Yes | Yes | Yes | — | — | Yes | — |
| Example 1[a] | Yes | Yes* | Yes | Yes* | Yes* | Yes | Yes |
| Example 6[b] | Yes | Yes | — | — | — | — | — |
| Dodecylaniline[b] | Yes | No | No | — | — | No | — |
| Butyl Nicotinate[b] | No | No | No | — | — | — | — |
| Cetyltrimetyl-ammonium Bromide[b] | Yes | — | No | No | No | — | — |
| Example 2[a] | Yes | Yes* | Yes | — | — | Yes* | — |

[a]Used a carbon black product from Example 7.
[b]Used a carbon black product from Example 8.
*Indicates that the carbon was weakly flocculated in the solvent phase.

EXAMPLE 12

Flocculation/Solvent Dispersion of Carbon Black Products

A carbon black product from Example 10 functionalized with 0.32 mequiv/g quaternary ammonium groups was dispersed in approximately 10 mL of deionized water. A solution of one molar equivalent of the compound shown in the table below in 1 mL deionized water was added to the dispersion with stirring and/or shaking. After about 5 minutes, the dispersion was examined for evidence of flocculation. Those materials which caused the dispersion to flocculate are indicated in the table below. These materials were then tested for solvent dispersibility by adding ca. 1 mL of dispersion to a mixture of an organic solvent and deionized water, and then shaking vigorously. Results are indicated in the table.

| Amphiphilic Compound | Flocculate? | Xylene | Benzyl Alcohol | 2-Heptanone |
|---|---|---|---|---|
| Sodium Dodecylsulfate | Yes | No | Yes* | No |
| Sodium Dodecylbenzene sulfonate | Yes | No | Yes* | No |
| Sodium Oleate | Yes | No | No | No |
| Sodium Bis(2-ethylhexyl)sulfosuccinate | Yes | No | Yes | Yes |

*Indicates that the carbon was weakly flocculated in the solvent phase.

EXAMPLE 13

Preparation of an Amphiphilic Salt of a Carbon Black Product

A dispersion of the carbon black product of Example 7 (250 g) was made in deionized water (2250 mL). To this well stirred dispersion was added a solution of oleylamine (18.7 g) in acetic acid (250 mL). The mixture immediately became thick and frothy. After 1–2 hours, the product was checked for flocculation and solvent dispersibility as described in Example 11. The black was dispersed in the solvent (butyl acetate) indicating a complete treatment. The slurry was filtered on a Buchner funnel and washed with 50% ethanol and deionized water. The product was dried to constant weight in an oven at 35°–45° C.

EXAMPLE 14

Preparation of Other Amphiphilic Salts of Carbon Black Products

The procedure of Example 13 was followed using the mount of reagents shown in the table below:

| Example # | Amount of Carbon Black (g) Product/ Example # | mmol $SO_3^-$/g | Amount of Amine (g)/Example # | Amount of Acetic Acid (mL) | Amount of Water (mL) |
|---|---|---|---|---|---|
| 14a | 100/7 | 0.26 | 20.0/1 | 100 | 900 |
| 14b | 100/7 | 0.26 | 16.43/2 | 100 | 1,000 |
| 14c | 40/7 | 0.26 | 2.51/ (hexadecylamine) | 40 | 360 |
| 14d | 50/7 | 0.17 | 2.06/4 | 50 | 500 |
| 14e | 12.7/8 | 0.95 | 12.7/6 | 15 | 135 |
| 14f | 50/7 | 0.26 | 3.7/ArmeenSD* | 50 | 450 |
| 14g | 200/8 | 0.26 | 58.3/ olylamine | 200 | 1,700 |

*Armeen SD is a soyalkylamine from Akzo Chemicals Inc., Chicago, IL.

EXAMPLE 15

Use of Carbon Products with Amphiphilic Cations in Gloss Ink

The carbon black products of Examples 13 and 14f were evaluated in a standard heat set gloss ink formulation prepared on a three roll mill. Their performance was compared to an untreated standard, a carbon black with a surface area of 58 $m^2$/g and a DBPA of 46 mL/100 g.

The carbon black samples were ground in a Waring blender to break down the pelleted structure for about 30 seconds, then prepared for grind on a three roll mill by hand mixing 15 g of the carbon black with 35 g of the grind masterbatch. Sample sizes for the carbon black products of Example 13 and 14f were weight compensated for the amount of treatment applied to the carbon (16.3 and 16.8 g, respectively). The masterbatch consists of 9 parts LV-3427XL (heatset grinding vehicle, Lawter International, Northbrook, Ill.) to 1 part MAGIESOL 47 oil. This mixture, 50 g, was ground on a Kent three roll milling running at 70° F. Samples were let down by mixing with an equal amount of grind masterbatch and then applied to a NIPRI production grindometer G-2 for evaluation of the grind. The standards were typically passed four times through the mill. Additional passes were made if the grind gauge reading was above 20 microns. The finished ink was produced by mixing the milled material with an equal weight of letdown masterbatch (3 parts LV3427XL; 12 parts LV6025 (heatset gel vehicle, Lawter International); 5 parts MAGIESOL 47 oil) and passing one time through the three roll mill.

MAGIESOL is a registered trademark for oils available from Magic Brothers, Franklin Park, Ill.

Fineness of grind data and viscosity measurements of the resulting inks are shown in the table below. The values in the grind data table are in microns as measured on a G-2 grind gauge and indicate the level where 10 scratches/5 scratches/5 defect grains are detected on the gauge. Steel bar Laray viscosity was measured according to ASTM method D4040-91 at 25° C. using a TMI 95-15-00 Laray viscometer (Testing Machines, Inc.).

| Carbon Product from Example # | Standard | 13 | 14f | 13** |
|---|---|---|---|---|
| Grind Gauge | | | | |
| 1 mill pass | 22/9/50+ | Hangback | 0/0/26 | 0/0/22 |
| 2 mill passes | 0/0/32 | 0/0/22 | 0/0/19 | 0/0/22 |
| 3 mill passes | 0/0/21 | 0/0/20 | 0/0/16 | 0/0/18 |
| 4 mill passes | 0/0/20 | 0/0/18 | 0/0/16 | 0/0/18 |

-continued

| Carbon Product from Example # | Standard | 13 | 14f | 13** |
|---|---|---|---|---|
| Laray Viscosity Data | | | | |
| Viscosity (poise at 2500 s–1) | 62.7 | 48.4 | 51.0 | 50.9 |
| Yield value (dyne/cm at 2.5 s–1) | 654 | 355 | 350 | 354 |

**This sample was premixed with the grind vehicle in a Dispermat CV (Getzman GmbH, Germany) at 11,000 rpm for 30 minutes.

Amphiphilic treated carbon black products demonstrate significantly enhanced dispersion rates over that of an unmodified standard. Laray viscosity measurements showed decreased viscosity and yield values for these samples.

Optical properties for inks made from the carbon black products 13 and 14f and the standard carbon black were determined from prints made using an RNA-52 printability tester (Research North America, Inc.) and are shown in the table below. Values for 1.0 and 2.0 micron film thicknesses were calculated from linear regression of the data from the prints made over a range of film thicknesses. A Hunter Lab Scan 6000 (10 degree D65 CIE LAB color space instrument manufactured by Hunter Assocs., Fairfax, Va.) was used to measure L*, a*, and b* values. Optical density was measured with a MacBeth RD918 densitometer. Gloss was measured with a BYK Gardner model 4527 glossmeter.

Data for a 1 micron film thickness

| Example # | Optical Density | L* | a* | b* | Gloss (60°) |
|---|---|---|---|---|---|
| Standard | 1.32 | 26.48 | 1.37 | 4.18 | 50.0 |
| 13 | 1.37 | 24.74 | 1.54 | 4.49 | 51.5 |
| 14f | 1.36 | 23.62 | 1.49 | 4.18 | 49.5 |
| 13** | 1.39 | 23.29 | 1.49 | 4.41 | 50.8 |

Data for a 2 micron film thickness

| Example # | Optical Density | L* | a* | b* | Gloss (60°) |
|---|---|---|---|---|---|
| Standard | 2.18 | 4.16 | 0.83 | 1.02 | 56.9 |
| 13 | 2.06 | 6.26 | 0.97 | 1.76 | 57.2 |
| 14f | 2.07 | 6.15 | 1.07 | 1.40 | 56.4 |
| 13** | 2.07 | 6.51 | 0.69 | 1.28 | 57.9 |

**This sample was premixed with the grind vehicle in a Dispermat CV (Getzman GmbH, Germany) at 11,000 rpm for 30 minutes.

These results indicate that optical properties of the ink films produced from the amphiphile treated carbon black products are of similar quality to that of the standard.

EXAMPLE 16

Use of Carbon Products with Amphiphilic Cations in Gloss Ink

The procedure of Example 15 was repeated using the carbon product produced in Example 14a. Sample sizes for the carbon black product 14a was weight compensated for the amount of treatment applied to the carbon (18 g).

| Carbon Product From Example # | Standard | 14a |
|---|---|---|
| Grind Gauge | | |
| 1 mill pass | 12/0/50+ | 0/0/32 |
| 2 mill passes | 0/0/27 | 0/0/19 |
| 3 mill passes | 0/0/22 | 0/0/18 |
| 4 mill passes | 0/0/20 | 0/0/16 |
| Laray Viscosity Data | | |
| Viscosity (poise at 2500 s−1) | 53.2 | 48.1 |
| Yield Value (dyne/cm at 2.5 s−1) | 350 | 364 |

Amphiphile treated carbon black products demonstrate significantly enhanced dispersion rates over that of an unmodified standard. Laray viscosity measurements show decreased viscosity for this sample.

Optical properties for inks made from the carbon black products 14a and the standard carbon black were determined as in Example 15 and are shown in the tables below.

Data for a 1 micron film thickness

| Carbon from Example # | Optical Density | L* | a* | b* | Gloss (60°) |
|---|---|---|---|---|---|
| Standard | 1.43 | 24.33 | 1.39 | 3.94 | 48.8 |
| 14a | 1.42 | 22.75 | 1.76 | 5.02 | 50.3 |

Data for a 2 micron film thickness

| Carbon from Example # | Optical Density | L* | a* | b* | Gloss (60°) |
|---|---|---|---|---|---|
| Standard | 2.24 | 3.79 | 0.50 | 0.30 | 56.2 |
| 14a | 2.12 | 6.28 | 1.12 | 1.43 | 54.4 |

These results indicate that optical properties of the ink films produced from these amphiphile treated carbon black products are of similar quality to that of the standard.

EXAMPLE 16'

Use of Carbon Products with Amphiphilic Cations in Gloss Ink

The procedure of Example 15 was repeated using the carbon products produced in Examples 14b and 14d.

| Carbon Product From Example # | Standard | 14b | 14d |
|---|---|---|---|
| Grind Gauge | | | |
| 1 mill pass | 15/10/50+ | Separation | Separation |
| 2 mill passes | 11/9/48 | 0/0/24 | 8/0/50 |
| 3 mill passes | 8/6/38 | 0/0/20 | 0/0/30 |
| 4 mill passes | 0/0/20 | | 0/0/25 |
| 5 mill passes | | | 0/0/35 |
| Carbon Product From Example # | Standard | 14b | 14d |
| Laray Viscosity Data | | | |
| Viscosity (poise at 2500 s−1) | 45.2 | 35.2 | 37.3 |
| Yield Value (dyne/cm at 2.5 s−1) | 403 | 317 | 234 |

The amphiphile treated carbon black product of Example 14b demonstrated significantly enhanced dispersion rate over that of an unmodified standard. Example 14d was somewhat more difficult to disperse.

Optical properties for inks made from the carbon black products 14b, 14d, and the standard carbon black were determined as in Example 15 and are shown in the tables below.

Data for a 1 micron film thickness

| Carbon from Example # | Optical Density | L* | a* | b* | Gloss (60°) |
|---|---|---|---|---|---|
| Standard | 1.26 | 27.62 | 1.48 | 4.52 | 45.2 |
| 14b | 1.45 | 21.38 | 1.80 | 5.02 | 45.4 |
| 14d | 1.43 | 22.43 | 1.80 | 5.10 | 41.9 |

Data for a 2 micron film thickness

| Carbon from Example # | Optical Density | L* | a* | b* | Gloss (60°) |
|---|---|---|---|---|---|
| Standard | 2.06 | 6.80 | 0.93 | 1.30 | 55.1 |
| 14b | 2.04 | 7.84 | 0.72 | 1.15 | 42.2 |
| 14d | 2.11 | 5.57 | 0.69 | 0.39 | 42.6 |

These results indicate that optical properties of the ink films produced from these amphiphile treated carbon black products may be of similar quality to that of the standard at equal sample weights.

EXAMPLE 16"

Use of a Carbon Product with Amphiphilic Cations in Gloss Ink

The procedure of Example 15 was repeated using the carbon product produced in Example 14c. Sample size for the carbon black product of Examples 14c was weight compensated for the amount of treatment applied to the carbon (16.6 g).

| Carbon Product From Example # | Standard | 14c |
|---|---|---|
| Grind Gauge | | |
| 1 mill pass | 10/7/47 | 0/0/26 |
| 2 mill passes | 6/4/34 | 0/0/20 |
| 3 mill passes | 0/0/25 | 0/0/18 |
| 4 mill passes | 0/0/21 | 0/0/18 |
| Laray Viscosity Data | | |
| Viscosity (poise at 2500 s−1) | 44.1 | 38.8 |
| Yield Value (dyne/cm at 2.5 s−1) | 460 | 371 |

The amphiphile treated carbon black of Example 14c demonstrates significantly enhanced dispersion rates and lower Laray viscosity than that of an unmodified standard.

Optical properties for inks made from the carbon black products 14c and the standard carbon black were determined as in Example 15 and are shown in the tables below.

Data for a 1 micron film thickness

| Carbon from Example # | Optical Density | L* | a* | b* | Gloss (60°) |
|---|---|---|---|---|---|
| Standard | 1.34 | 24.84 | 1.52 | 4.57 | 44.7 |
| 14c | 1.36 | 23.54 | 1.78 | 4.92 | 47.0 |

Data for a 2 micron film thickness

| Carbon from Example # | Optical Density | L* | a* | b* | Gloss (60°) |
|---|---|---|---|---|---|
| Standard | 2.04 | 6.71 | 0.99 | 1.46 | 50.7 |
| 14c | 2.15 | 4.85 | 0.64 | 0.26 | 51.8 |

These results indicate that optical properties of the ink films produced from the amphiphile treated carbon black product of Example 14c is somewhat denser, jetter, and glossier than that of the standard.

EXAMPLE 17

Use of a Carbon Black Product Treated with Amphiphilic Cations in a Urethane Hardened Acrylic Formulation This example illustrates the use of carbon black products in an acrylic enamel formulation. Carbon black products from Examples 14e, 14g, and 8 were used in the following composition. The carbon black products were ground in small steel mills (2 1/16" tall×2 3/32" diameter) on a paint shaker. Each mill was charged with 200 g 3/16" chrome steel balls, 2.19 g carbon product, and 19.9 g of grind vehicle consisting of an 80/20 mixture of DMR-499 acrylic mixing enamel (PPG Finishes, Strongsville, Ohio) and xylene. This mixture was ground for 50 minutes. Samples were evaluated on a Hegman gauge. The final formulation was made by adding 23.3 g DMR-499, 17.3 g xylene and 1.4 g DXR-80 urethane hardener (PPG Finishes, Stronsville, Ohio) to the mill and shaking for 15 minutes. A 3 mil drawdown of the completed formulation was made on a sealed Lenata chart. The film was air dried for 30 minutes, then baked at 140° F. for 30 minutes. Optical properties were determined as described in Example 15.

The standard was a carbon black with a CTAB surface area of 350 m²/g and a DBPA of 120 mL/100 g without any additional treatments. Sample size for the carbon black products of Examples 14e was partially weight compensated for the amount of treatment applied to the carbon (2.83 g); the sample size for 14 g was fully weight compensated (3.24 g). Optical properties and Hegman grinds are shown in the table below. Hegman values were measured on a Hegman gauge where 5 'sand' particles are clustered.

| Carbon from Example # | Optical Density | L* | a* | b* | Gloss (60°) | Hegman Grind at 50 min. |
|---|---|---|---|---|---|---|
| Standard | 2.83 | 1.23 | 0.08 | 0.05 | 52.3 | 4.0 |
| 14e | 3.01 | 0.75 | 0.064 | −0.46 | 91.2 | 5.5 |
| 14g | 2.96 | 0.93 | 0.26 | 0.09 | 85.1 | 5.3 |
| 8 | 2.79 | 1.41 | 0.17 | −0.03 | 92.5 | 6.2 |

These results show that use of the product of Example 14e in this formulation results in a denser, jetter, and bluer coating than that produced by an unmodified carbon black, or by the precursor carbon of Example 8. The product of Example 14g was denser and jetter than the standards.

EXAMPLES 18a–18n

Treatment of Carbon Black Product with a Polymeric Cationic Amphiphile

The carbon black products in these examples were prepared using the following procedure.

An amine-containing polymer was prepared by emulsion polymerization. To a 1-liter round-bottom flask equipped with a reflux condenser, addition funnel, gas inlet tube, stirrer, and hot water bath with thermometer was added 264.34 g of water and 0.089 g of sodium carbonate. The flask was heated to approximately 70° C. and was sparged with nitrogen for 1 hour. The nitrogen sparge was changed to a sweep, and 15.0 g of a 10% aqueous solution of sodium dodecylbenzene sulfonate was added. The flask was then heated to 85° C. Once at this temperature, 10% (6.0 mL) of an initiator solution (prepared by dissolving 0.20 g of ammonium persulfate in 57.3 g of water) was added, followed by 10% (35.0 g) of an emulsified monomer mixture (prepared by adding 196.6 g methyl methacrylate (MMA), 3.4 g 2-(dimethylamino)ethyl methacrylate (DMAEMA), 1.0 g n-dodecylmercaptan, and 5.0 g of a 10% aqueous solution of sodium dodecylbenzene sulfonate to 118.0 g of water with vigorous stirring. Once emulsified, this mixture was stirred continuously to maintain a good emulsion. A rinse of 4.7 mL of water was used for each addition. The reaction was stirred for 1 hour at 85° C., during which a color change was observed indicating the formation of polymer. After this time, the remainder of the emulsified monomer mixture was gradually added to the reaction flask dropwise over the next 3 hours. Also during this time, the remainder of the initiator solution was added to the reaction flask in 4 mL portions every 15 minutes. At the completion of the monomer and initiator additions, each flask was rinsed with 4.7 mL of water, and these rinses were added to the reaction flask. The temperature was maintained at 85° C. for an additional hour. Then the reaction was allowed to cool to room temperature and stirred overnight.

A dispersion of the carbon black product of Example 8 was prepared by adding 3.70 g of the dry carbon black to 400 mL of water in a 1 liter beaker equipped with an overhead stirrer. This was stirred at room temperature for 10 minutes. To this dispersion was added 0.214 g of glacial acetic acid followed by 131.2 g of a latex containing 33.3 g of a 98.3/1.7 copolymer of methylmethacrylate (MMA) and 2-(dimethylamino)ethyl methacrylate (DMAEMA) prepared as described above. The mixture was stirred for 2 hours at room temperature. A solution of 11.4 g of magnesium acetate tetrahydrate in 400 mL of water in a 2 liter beaker equipped with an overhead stirrer and hot plate was heated to 70° C., and to this was added the carbon black/polymer mixture. This was stirred for 20 minutes at this temperature and filtered, and the resulting carbon black product was dried in a vacuum oven at 75° C. to constant weight.

The following carbon black products were prepared following this procedure: Here, CB-1 refers to the carbon black product of Example 8 and CB-2 refers to the carbon black from which the carbon black product of Example 8 was prepared.

| Example 18 | Carbon Black | Dry Wt. of Carbon Black (g) | Wt. of Polymer in Latex | Polymer | Wt. of Acetic Acid (g) |
|---|---|---|---|---|---|
| a | CB-1 | 1.85 | 33.3 | P(MMA/DMAEMA)(98.3/1.7) | 0.214 |
| b | CB-1 | 3.70 | 33.3 | P(MMA/DMAEMA)(98.3/1.7) | 0.214 |
| c | CB-1 | 11.10 | 33.3 | P(MMA/DMAEMA)(98.3/1.7) | 0.214 |
| d | CB-1 | 18.50 | 33.3 | P(MMA/DMAEMA)(98.3/1.7) | 0.214 |
| e | CB-1 | 29.60 | 33.3 | P(MMA/DMAEMA)(98.3/1.7) | 0.214 |
| f | CB-2 | 4.43 | 40.0 | PMMA | 0 |
| g | CB-2 | 4.43 | 40.0 | PMMA | 0.252 |
| h | CB-1 | 4.43 | 40.0 | PMMA | 0 |
| i | CB-1 | 4.43 | 40.0 | PMMA | 0.252 |
| j | CB-2 | 4.43 | 40.0 | P(MMA/DMAEMA)(98.3/1.7) | 0 |
| k | CB-2 | 4.43 | 40.0 | P(MMA/DMAEMA)(98.3/1.7) | 0.252 |
| l | CB-1 | 4.43 | 40.0 | P(MMA/DMAEMA)(98.3/1.7) | 0 |
| m | CB-1 | 4.43 | 40.0 | P(MMA/DMAEMA)(98.3/1.7) | 0.252 |
| n | CB-1 | 22.4 | 200 | P(MMA/DMAEMA)(98.3/1.7) | 1.28 |

EXAMPLES 19a–19h

Demonstration of Dispersibility of Carbon Black Products in an Organic Solvent

Each of the carbon black products was manually crashed to obtain a reasonably fine powder. After weighing the sample, the carbon black product was placed in a Soxhlet extractor and extracted with methylene chloride for at least 24 hours. Any remaining sample (residual) was dried to constant weight. The methylene chloride solutions were evaporated in vacuo on a rotary evaporator, and the weight of the organic soluble material (extractable) was recorded.

Following this procedure, the following results were obtained for the carbon black products of Examples 18a–18e. In addition to the carbon black products, control samples were analyzed by the same method. Here, Polymer 1 is P(MMA/DMAEMA)(98.3/1.7) and CB-2 is the carbon black product from which the carbon black product of Example 8 is prepared.

amount of groups with opposite charge on the carbon black (Example 19e), extractable levels are high. Above this, extractable levels decrease. This demonstrates a method for producing a carbon black product that can disperse in organic solvents.

EXAMPLES 20a–20l

Demonstration of Dispersibility of Carbon Black Products in an Organic, Solvent

Following the procedures described in Example 19, the following results were obtained for the carbon black products of Examples 18f–18n. In addition to the carbon black products, control samples were analyzed by the same method. Here, Polymer 2 is P(MMA/DMAEMA)(98.3/1.7), Polymer 3 is PMMA, and CB-2 is the carbon black from which the carbon black product of Example 8 is prepared.

| Example 19 | Sample Description | Sample Prior to Extraction with Solvent | | After Extraction with Solvent | |
|---|---|---|---|---|---|
| | | Wt % Carbon Black | Wt % Polymer | Wt % Residual | Wt % Extractable |
| a | Polymer 1 | 0 | 100 | 7.8 | 92.2 |
| b | Carbon Black Product of Example 8 | 100 | 0 | 96.8 | 3.2 |
| c | CB-2 | 100 | 0 | 100 | 0 |
| d | Carbon Black Product of Example 18a | 5.3 | 94.7 | 5.4 | 94.6 |
| e | Carbon Black Product of Example 18b | 10.0 | 90.0 | 1.7 | 98.3 |
| f | Carbon Black Product of Example 18c | 25.0 | 75.0 | 38.7 | 61.3 |
| g | Carbon Black Product of Example 18d | 35.7 | 64.3 | 56.8 | 43.2 |
| h | Carbon Black Product of Example 18e | 47.1 | 52.9 | 65.5 | 34.5 |

These examples demonstrate that, when the amount of amphiphilic groups on the polymer is equivalent to the

| Example 20 | Sample Description | Sample Prior to Extraction with Solvent | | After Extraction with Solvent | |
|---|---|---|---|---|---|
| | | Wt % Carbon Black | Wt % Polymer | Wt % Residual | Wt % Extractable |
| a | Polymer 2 | 0 | 100 | 0 | 100 |
| b | Polymer 3 | 0 | 100 | 0 | 100 |
| c | Carbon Black Product of Example 8 | 100 | 0 | 96.8 | 3.2 |
| d | CB-2 | 100 | 0 | 100 | 0 |
| e | Carbon Black Product of Example 18f | 10 | 90 | 13.6 | 86.4 |
| f | Carbon Black Product of Example 18g | 10 | 90 | 12.6 | 87.4 |
| g | Carbon Black Product of Example 18h | 10 | 90 | 5.5 | 94.5 |
| h | Carbon Black Product of Example 18i | 10 | 90 | 6.5 | 93.5 |
| i | Carbon Black Product of Example 18j | 10 | 90 | 11.2 | 88.8 |
| j | Carbon Black Product of Example 18k | 10 | 90 | 12.7 | 87.3 |
| k | Carbon Black Product of Example 18l | 10 | 90 | 5.7 | 94.3 |
| l | Carbon Black Product of Example 18m | 10 | 90 | 0.5 | 99.5 |

These examples demonstrate that, when both the amphiphilic polymer and carbon black bearing the opposite charge are present in equivalent amounts, improved dispersibility in organic solvent is observed (Example 20l). These examples also demonstrate that either when the polymer is not amphiphilic (as in Example 20g and Example 20h in which no amine is present and in Example 20k in which no acid is present) or when the carbon black does not bear an opposite charge (as in Examples 20e, 20f, 20i, and 20j), this effect is not seen. This demonstrates a method for producing a carbon black product that can disperse in organic solvents.

EXAMPLE 21

Demonstration of Dispersibility of Carbon Black Products in an Organic Solvent

Following the procedure described in Example 19, the following results were obtained for the carbon black product of Example 18n. In addition to the carbon black product, control samples were analyzed by the same method. Here, Polymer 2 is P(MMA/DMAEMA)(98.3/1.7) and CB-2 is the carbon black from which the carbon black product of Example 8 is prepared.

| Example 20 | Sample Description | Sample Prior to Extraction with Solvent | | After Extraction with Solvent | |
|---|---|---|---|---|---|
| | | Wt % Carbon Black | Wt % Polymer | Wt % Residual | Wt % Extractable |
| a | Polymer 2 | 0 | 100 | 0 | 100 |
| c | Carbon Black Product of Example 8 | 100 | 0 | 96.8 | 3.2 |
| d | CB-2 | 100 | 0 | 100 | 0 |
| 21 | Carbon Black Product of Example 18n | 10 | 90 | 0 | 100 |

This example demonstrates that this process is also effective at larger scales.

EXAMPLE 22

Performance of Butyl Nicotinate

A 1 g sample of the product of Example 8 was treated according to Example 11 with butyl nicotinate. This material did not flocculate. A UPA particle size analysis indicated that the material was still well dispersed, mean particle diameter of 0.155 microns. Approximately 2 mL sample of this solution was applied to a sheet of copier paper and drawn down with a 3 mil Bird applicator. The drawdown was air dried 10–15 minutes and the optical density was determined to be 1.30. The drawdown was then rinsed with a stream of deionized water until no further run off of black pigment was observed. This was allowed to dry and the optical density of the water rinsed region was determined to be 1.29. Therefore, 99% of the optical density was retained. Results for the product of Example 8 alone are for unwashed and washed areas 1.31 and 1.18 respectively. In this case, only 90% of the optical density was retained.

These results indicate that addition of a cationic amphiphile to a dispersed solution of a carbon black product such as that of Example 8 can affect the properties of the carbon black product even though there was no change in the solution behavior of the mixture.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising a) an amphiphilic ion and b) a modified carbon product comprising carbon having attached at least one organic group, wherein said at least one organic group has a charge opposite to said amphiphilic ion.

2. The composition of claim 1, wherein said amphiphilic ion is cationic.

3. The composition of claim 2, wherein said amphiphilic ion is an ammonium ion formed by adding an acid to: a fatty amine, an ester of an aminoalcohol, an alkylamine, a polymer containing an amine functionality, aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine.

4. The composition of claim 2, wherein said amphiphilic ion is an ammonium ion formed by adding an acid to: an ester of an aminodiol, an ester of an aminotriol, a polyethyleneimine, a polyvinylimidazole, a homo- or co-polymer of vinylpyridine, a polyvinylimidazole, mixed polymers containing at least one amino-functional monomer, a fatty alcohol ester of aspartic acid, a fatty alcohol ester of glutamic acid, a pyridine derivative, an imidazole, or an imidazoline.

5. The composition of claim 4, wherein said amphiphilic ion is an ammonium ion formed by adding an acid to a fatty alcohol ester of glutamic acid.

6. The composition of claim 1, wherein said amphiphilic ion is an ammonium ion formed by adding an acid to a copolymer of dimethylaminoethyl methacrylate and methyl methacrylate.

7. The composition of claim 4, wherein said amphiphilic ion is an ammonium ion formed by adding an acid to di(myristyl)glutamate.

8. The composition of claim 1, wherein said amphiphilic ion is anionic.

9. The composition of claim 8, wherein said amphiphilic ion is an alkyl sulfonate, an alkylbenzene sulfonate, an alkylsulfate, a sarcosine, a sulfosuccinate, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, a salt of an aliphatic carboxylic acid, or an ion derived from a polymer containing an acid group.

10. The composition of claim 9, wherein said amphiphilic ion is derived from sodium dodecylbenzene sulfonate, sodium dodecylsulfate, an oleic acid salt, a ricinoleic acid salt, a myristic acid salt, a caproic acid salt, a sulfonated polystryrene, sodium bis(2-ethylhexyl)sulfosuccinate, or a homo- or copolymer of acrylic acid or methacrylic acid or its salt.

11. The composition of claim 10, wherein said amphiphilic ion is derived from sodium bis(2-ethylhexyl)-sulfosuccinate.

12. The composition of claim 1, wherein said carbon is carbon black, graphite, vitreous carbon, carbon fiber, finely-divided carbon, activated charcoal, or mixtures thereof.

13. The composition of claim 12, wherein said carbon is carbon black.

14. The composition of claim 1, wherein said organic group comprises a) at least one aromatic group or at least one $C_1$–$C_{12}$ alkyl group, and b) at least one ionic group, at least one ionizable group, or a mixture of an ionic group and an ionizable group, wherein the at least one aromatic group of the organic group is directly attached to the carbon, and wherein the at least one $C_1$–$C_{12}$ alkyl group of the organic group is directly attached to the carbon.

15. The composition of claim 1, wherein the organic group includes a carboxylate, a sulfonate, or a quaternary ammonium ion.

16. The composition of claim 1, wherein the organic group is $C_6H_4SO_3^-$ or $C_6H_4CO_2^-$.

17. The composition of claim 1, wherein the organic group is p-$C_6H_4SO_3^-$.

18. The composition of claim 1, wherein the organic group is $C_6H_4CO_2^-$.

19. The composition of claim 1, wherein the organic group is $C_6H_4NC_5H_5^+$ or $C_6H_4N(CH_3)_3^+$.

20. An aqueous ink composition comprising an aqueous vehicle and the composition of claim 1.

21. A coating composition comprising an aqueous vehicle and the composition of claim 1.

22. A non-aqueous ink composition comprising a non-aqueous vehicle and the composition of claim 1.

23. A non-aqueous coating composition comprising a non-aqueous vehicle and the composition of claim 1.

24. A non-aqueous ink jet ink composition comprising a vehicle and the composition of claim 1.

25. An aqueous emulsion ink jet ink composition comprising a solvent, water, and the composition of claim 1.

26. The aqueous emulsion ink jet ink composition of claim 25, further comprising a surfactant.

27. A suspension comprising the composition of claim 1 and a carrier or liquid vehicle.

28. A coating composition comprising an aqueous or non-aqueous vehicle, the composition of claim 1, and a coloring pigment other than carbon black.

29. A coating composition comprising an aqueous or non-aqueous vehicle, the composition of claim 2, and a coloring pigment other than carbon black.

30. A coating composition comprising an aqueous or non-aqueous vehicle, the composition of claim 3, and a coloring pigment other than carbon black.

31. A coating composition comprising an aqueous or non-aqueous vehicle, the composition of claim 4, and a coloring pigment other than carbon black.

32. A coating composition comprising an aqueous or non-aqueous vehicle, the composition of claim 8, and a coloring pigment other than carbon black.

33. A coating composition comprising an aqueous or non-aqueous vehicle, the composition of claim 9, and a coloring pigment other than carbon black.

34. A coating composition comprising an aqueous or non-aqueous vehicle, the composition of claim 10, and a coloring pigment other than carbon black.

35. A coating composition comprising an aqueous or non-aqueous vehicle, the composition of claim 11, and a coloring pigment other than carbon black.

36. A coating composition comprising an aqueous or non-aqueous vehicle, the composition of claim 12, and a coloring pigment other than carbon black.

37. A coating composition comprising an aqueous or non-aqueous vehicle, the composition of claim 14, and a coloring pigment other than carbon black.

38. A coating composition comprising an aqueous or non-aqueous vehicle, the composition of claim 1, and clay, talc, silica, or carbonate.

39. A coating composition comprising an aqueous or non-aqueous vehicle, the composition of claim 14, and clay, talc, silica, or carbonate.

40. A coating composition comprising an aqueous or non-aqueous vehicle, the composition of claim 16, and a coloring pigment other than carbon black.

41. A coating composition comprising an aqueous or non-aqueous vehicle, the composition of claim 19, and a coloring pigment other than carbon black.

* * * * *